United States Patent [19]

Ikawa et al.

[11] Patent Number: 6,057,664
[45] Date of Patent: May 2, 2000

[54] MOTOR DRIVING CONTROL UNIT AND MOTOR DRIVING CONTROL METHOD

[75] Inventors: Yasushi Ikawa; Kiyonari Kawajiri, both of Tokyo, Japan

[73] Assignee: Mitsubishi Denki Kabushiki Kaisha, Tokyo, Japan

[21] Appl. No.: 09/382,606

[22] Filed: Aug. 25, 1999

[30]   Foreign Application Priority Data

Aug. 26, 1998  [JP]  Japan ................................. 10-240379
Jun. 16, 1999  [JP]  Japan ................................. 11-170154

[51] Int. Cl.$^7$ ....................................................... H02P 5/28
[52] U.S. Cl. ......................... 318/811; 318/138; 318/254; 318/439; 318/511
[58] Field of Search ..................................... 318/139, 439, 318/254, 811, 511, 807–810; 388/811, 819, 829

[56]                References Cited

U.S. PATENT DOCUMENTS 5,252,902  10/1993  Uehara et al. ............................ 318/599
5,742,143   4/1998  Katagiri ................................... 318/625
5,949,663   9/1999  Endo et al. ................................ 363/37

FOREIGN PATENT DOCUMENTS 63-48196  2/1988  Japan .
64-23792  1/1989  Japan .
 4-69096  3/1992  Japan .
 4-281385 10/1992  Japan .
 6-141550  5/1994  Japan .
 7-123800  5/1995  Japan .
 8-033400  2/1996  Japan .
 9-149700  6/1997  Japan .
 9-229972  9/1997  Japan .

OTHER PUBLICATIONS

"Practical on Theory and Designing of AC servo system", H. Sugiyama et al, General Electron Publisher, May 8, 1990.

*Primary Examiner*—Karen Masih
*Assistant Examiner*—Rina I. Duda
*Attorney, Agent, or Firm*—Sughrue, Mion, Zinn, Macpeak & Seas, PLLC

[57]                    ABSTRACT

A motor driving control apparatus comprises a current detecting section for detecting an output current from an inverter section; a current control section for outputting a voltage instruction to a PWM section from the detected current value, a current instruction from an external device, and from a positional signal of an encoder connected to a motor; and a PWM section for outputting a PWM signal to the inverter section according to a voltage instruction, and an encoder I/F section for receiving a positional signal for the encoder is provided in an external interface section, the current control section and PWM section are provided in an N potential control section connected to the external interface section, and the external interface section transmits the current instruction and the positional signal inputted into the encoder I/F section through serial communications via an insulating section.

12 Claims, 16 Drawing Sheets

FIRST CURRENT CONTROL SECTION

MOTOR DRIVING CONTROL UNIT AND MOTOR DRIVING CONTROL METHOD

FIELD OF THE INVENTION

The present invention relates to a motor driving control apparatus and a motor driving control method, and more particularly to a motor driving control apparatus having a position control loop and a current control loop for controlling a current passing through a motor according to a current instruction inputted from an external device as well as to a motor driving control method.

BACKGROUND OF THE INVENTION

A motor driving control apparatus for controlling a current passing through a motor according to a current instruction inputted from an external device has to control a current passing through the motor with high precision and fast response. A motor driving control apparatus with a three-phase voltage type of PWM inverter based on the conventional technology transmits six PWM signals from an external interface potential control section to an inverter section via six photocouplers. Furthermore, there is, in order to reduce a number of insulating components, a device of a type of, not directly transmitting a PWM signal to an inverter section via a photocoupler, but coupling an external interface potential control section to an N potential control section through serial communications via a photocoupler and transmitting a PWM signal from a PWM section provided in the N potential control section to the inverter section.

FIG. 14 shows a conventional type of motor driving control apparatus with an external interface potential control section and an N potential control section coupled to each other through serial communications via a photocoupler. A motor 1 is driven by an inverter section 3 comprising switching elements such as IGBTs and transistors. A DC voltage is supplied to the inverter section 3 from a power supply via a diode module 6 and a smoothing capacitor 7. An encoder (position detector) 2 for detecting a position is connected to the motor 1.

The motor driving control apparatus is divided into an external interface potential control section A for receiving a current instruction i* from an external device and executing communications of a positional signal from the encoder 2 as well as into an N potential control section B for outputting a PWM signal to the inverter section 3. The external interface potential control section A obtains a positional signal θ of the motor 1 by receiving the positional signal from the encoder 2 via an encoder I/F section 18.

The current passing through the motor 1 is detected by a current detecting section 11 comprising an operational amplifier and a filter for detecting voltages at both ends of each of U-phase and V-phase detection resistors 4 and 5. The detected value of the current is transmitted to the external interface potential control section A via an insulating amplifier 8 in an insulating section C and analog-to-digital-converted by an A/D converter 14 in the external interface potential control section A.

A current control section 15 in the external interface potential control section A computes the PWM voltage instructions (Vu*, Vv*, Vw*) according to the position signal θ, current detected values iufb, ivfb of the motor 1, as well as to the current instruction i* inputted from the external device. The PWM voltage instructions (Vu*, Vv*, Vw*) are transmitted to the N potential control section B based on serial communications between the external interface potential control section A and N potential control section B via the photocoupler 9 in the insulating section C, and a PWM signal is outputted from the PWM section 10 in the N potential control section B to the inverter section 3. An alarm signal or the like outputted from a protecting circuit 12 as information such as over-current or regeneration error in the N potential control section B is transmitted from the N potential control section B to the external interface potential control section A via the photocoupler 9 in the insulating section C with serial communications.

Each of serial communications I/F sections 13, 17 provided in the external interface potential control section A and the N potential control section B respectively has functions for transmitting/receiving data (STX) transmitted from the external interface potential control section A, a synchronizing clock for serial communications (SCLK) as a synchronization signal to the data (STX), and data (SRX) such as alarm information transmitted from the N potential control section B. The transmitting section of each of serial communications I/F sections 13, 17 converts parallel data stored in a register to serial data, and the receiving section of each of serial communications I/F sections 13, 17 periodically samples the serial data to store the data in a register respectively.

FIG. 15 shows timings in operations from current detection to output of a PWM signal in the conventional type of motor driving control apparatus with the configuration as described above. An output current from the inverter section 3 is detected, and A/D conversion of the detected current requires an A/D converting time Tad. Then, a time for preparing a PWM voltage instruction Tpwm is required to prepare PWM voltage instructions (Vu*, Vv*, Vw*) in the current control section 15 according to information for the converted values iufb, ivfb, the current instruction i* inputted from an external device, and the positional signal θ from the encoder 2.

FIG. 16 shows internal configuration of the current control section 15 provided in the external interface potential control section A. Herein, current control on ordinary d-q coordinate axes is described as an example, and a drawing shown in a document "Practical on Theory and designing of AC servo system—From basic to software servo—; Chapter 4, by Sugimoto et al. published by Sogo Denshi Shuppan-sha" is shown as a block diagram.

The current control section 15 inputs a SIN value from a SIN table 19 to a coordinate converting section 20 as well as to a coordinate reverse converting section 22 according to the position signal θ of the motor 1. The coordinate converting section 20 converts current feedback values iufb, ivfb detected in the current detecting section 11 from values on U-V coordinate axes to values iqfb, idfb on the d-q coordinate axes, and inputs deviation between the current instruction i* and the current feedback value iqfb on the q-axis into a PI control section 21 and also inputs deviation between zero and the current feedback value idfb on the d-axis into another PI control section 21. Each of the PI control sections 21 provides PI control as what is called a proportional-plus-integral control for the deviations, and the coordinate reverse converting section 22 reverse converts the values from the d-q coordinate axes to the U-V coordinate axes again, and outputs the PWM voltage instructions (Vu*, Vv*, Vw*). The W-phase voltage instruction Vw* is computed from the fact that a sum of three phases is zero.

The conventional type of motor driving control apparatus with the configuration as described above transmits the data from the current control section 15 to the PWM section 10 based on serial communications, so that a delay time in serial communications Tsd is required. Therefore, the conventional type of motor driving control apparatus requires a time from starting of current detection to output of PWM signals as expressed by the following equation, $$T\text{total}=Tad+Tpwm+Tsd.$$

Generally, when a delay time from current detection to output of PWM voltage instructions is shorter, response to a current can be enhanced. However, in the conventional type of motor driving control apparatus, serial communications are performed in order to eliminate the insulating section, therefore some delay time in serial communications is generated, so that it takes a longer time from detection of an output current till reflection thereof into the voltage instruction, namely the response can not be speeded up.

In addition, an insulating amplifier is required for current detection and an analog signal is transmitted between different potential control sections, therefore the apparatus is affected by noise due to pattern arrangement, which makes larger a packaging area to insure an insulation distance.

Since the current control section is provided in the external interface section, a high-speed serial communication system is required for providing controls with fast response, therefore response to a current is restricted in return by a serial communication speed.

Furthermore, when a plurality of motors are to be controlled, a plurality of motor driving control apparatuses as described above equivalent to the number of the motors are needed, and all of insulating sections, external interface sections and N potential control sections by a plurality of apparatuses are required even based on the serial communications. Therefore, there are problems such that a large packaging area is needed, the configuration is complicated, and the cost becomes high.

SUMMARY OF THE INVENTION

It is an object of the present invention to obtain, for the purpose of solving the problems as described above, a motor driving control apparatus which can enhance response to current control by reducing the time from current detection till output of PWM voltage instructions without restricting a serial communication speed; does not require an insulating amplifier for current detection; can suppress influence of noise thereto due to transmission of analog signals; has a smaller packaging area; can share some of configuration thereof, such as an external interface section with the plurality of motors when a plurality of motors are to be controlled; does not require a large packaging area for controlling a multi-axis motor; and can simplify the configuration thereof, as well as a motor driving control method in the same.

In the present invention, a current detecting section directly inputs a current detected thereby into a current control section in a N potential control section, and an external interface section transmits a current instruction and a positional signal inputted into a positional signal input section to the current control section through serial communications via a insulating section. Hence the current instruction and positional signal can be transmitted from the external interface section to the current control section in the N potential control section through serial communications before a current detected value is inputted into the current control section.

In the invention according to another aspect of the present invention, a first current control section creates a current-control correction value and a current instruction value by means of integration operations according to a current instruction received from outside, a received current detected value, and a positional signal inputted into a positional signal input section; and a second current control section receives the current-control correction value and the current instruction value created in the first current control section through serial communications via a insulating section. Then the second current control section performs proportional operation according to the current instruction value inputted from the first current control section as well as the directly inputted current detected value, and creates a voltage instruction to be outputted to a PWM section from the result of this operation, the current-control correction value inputted from the first current control section, and also from the directly inputted current detected value. Hence the integration operation that does not contribute to instant response such that proportion control does can be executed at any time other than the time from current detection till output of PWM voltage instructions and response to a current can be speeded up by a time for an integration operation.

In the invention according to another aspect of the present invention, there are steps of directly inputting a current detected by a current detecting section into a current control section in a N potential control section, inputting a positional signal from a position detector into a positional signal input section provided in an external interface section, and transmitting a current instruction and the positional signal inputted into the positional signal input section from the external interface section to the current control section in the N potential control section through serial communications via a insulating section before a current detected value is directly inputted thereinto. Hence a time required from current detection till output of PWM signals can be reduced by a delay time in serial communications for transmitting PWM voltage instructions from the external interface section to the N potential control section as compared to the time based on the conventional technology, and response to a current can be speeded up.

With the invention according to another aspect of the present invention, a first current control section creates a current-control correction value and a current instruction value by means of integration operations according to a current instruction received from outside, a received current detected value, and a positional signal inputted into a positional signal input section; and a second current control section receives the current-control correction value and the current instruction value created in the first current control section through serial communications via an insulating section. Then the second current control section performs proportional operation according to the current instruction value inputted from the first current control section as well as the directly inputted current detected value, and creates a voltage instruction to be outputted to a PWM section from the result of this operation, the current-control correction value inputted from the first current control section, and also from the directly inputted current detected value. Hence the integration operation that does not contribute to instant response such that proportion control does can be executed at any time other than the time from current detection till output of PWM voltage instructions and response to a current can be speeded up by a time for an integration operation.

Other objects and features of this invention will become understood from the following description with reference to the accompanying drawings.

DESCRIPTION OF THE PREFERRED EMBODIMENTS

Figure 1:
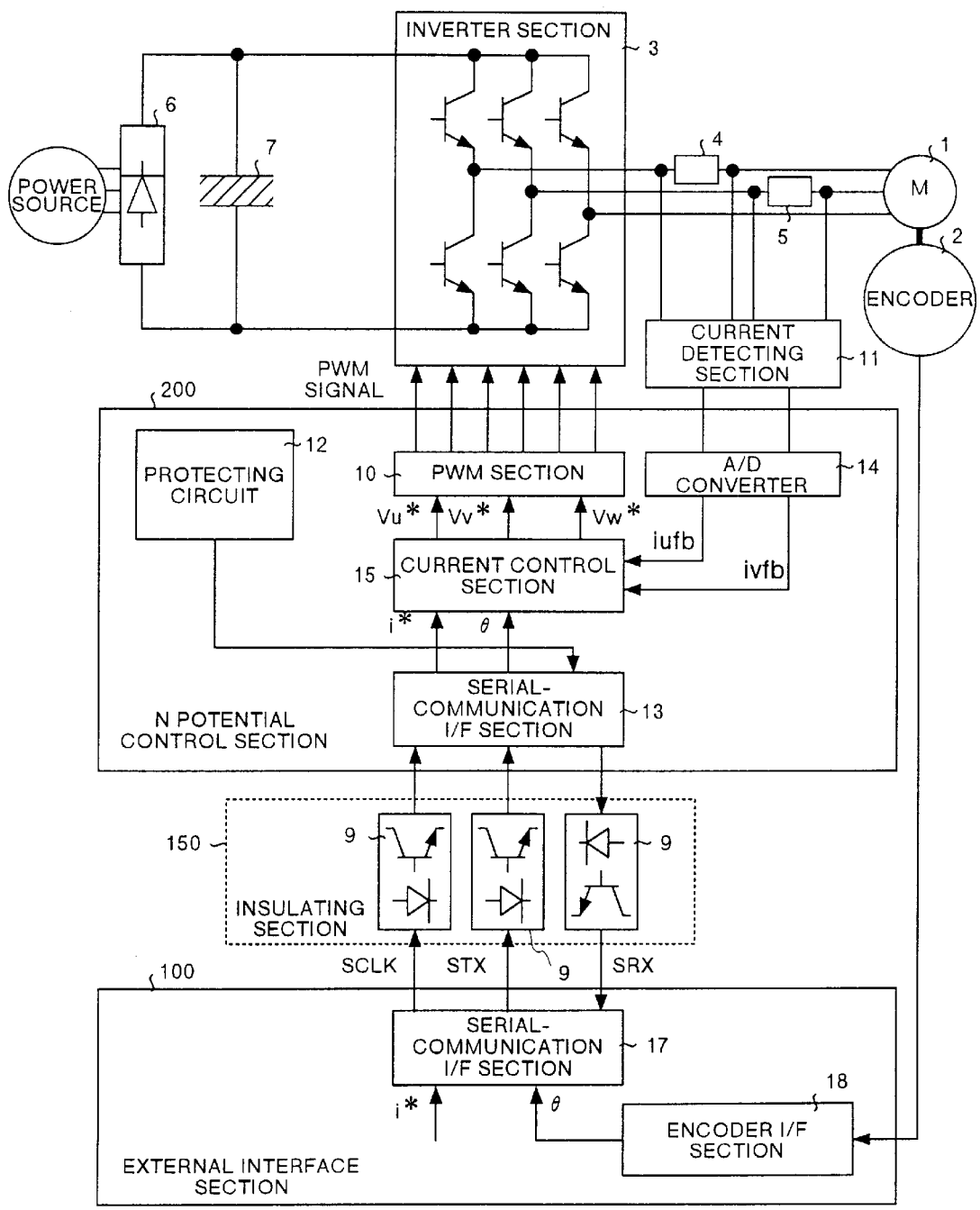
FIG. 1 is a block diagram showing Embodiment 1 of the motor driving control apparatus according to the present invention.

Detailed description is made hereinafter for the preferred embodiments of the motor driving control apparatus and the motor driving control method according to the present invention with reference to the attached drawings. In the embodiments of the present invention described hereinafter, the same reference numerals are assigned to components corresponding to those in the apparatus based on the conventional technology, and description thereof is omitted herein.

FIG. 1 shows Embodiment 1 of the motor driving control apparatus according to the present invention. The motor driving control apparatus according to Embodiment 1 has a current control section 15 in an N potential control section 200. In accordance with this configuration, an A/D converter 14 for supplying a current detected value to the current control section 15 is incorporated in the N potential control section 200, and an insulating amplifier of the insulating section is omitted. The current detected value is directly inputted from the A/D converter 14 to the current control section 15. Thus, the N potential control section 200 comprises a PWM section 10, a protecting circuit 12, a serial-communication I/F section 13, the A/D converter 14 for current detection signals, and the current control section 15.

An external interface section 100 has an encoder I/F section 18 as a positional signal input section for obtaining a positional signal θ of a motor 1 from the encoder (position detector) 2 and a serial-communication I/F section 17 for performing serial communications with the N potential control section 200. The external interface section 100 transmits a current instruction i* inputted from an external device and a positional signal θ fetched from the encoder I/F section 18 to the N potential control section 200 through serial communications via an insulating section 150. With this serial communications, the current control section 15 acquires a current instruction i* and a positional signal θ.

The insulating section 150 comprises three photocouplers 9 for transmitting data (STX) indicating a current instruction i* inputted from an external device and a positional signal 74, transmitting a clock signal (SCLK) as a synchronization signal to this data (STX), and transmitting data (SRX) indicating alarm information or the like from the N potential control section 200.

Figure 2:
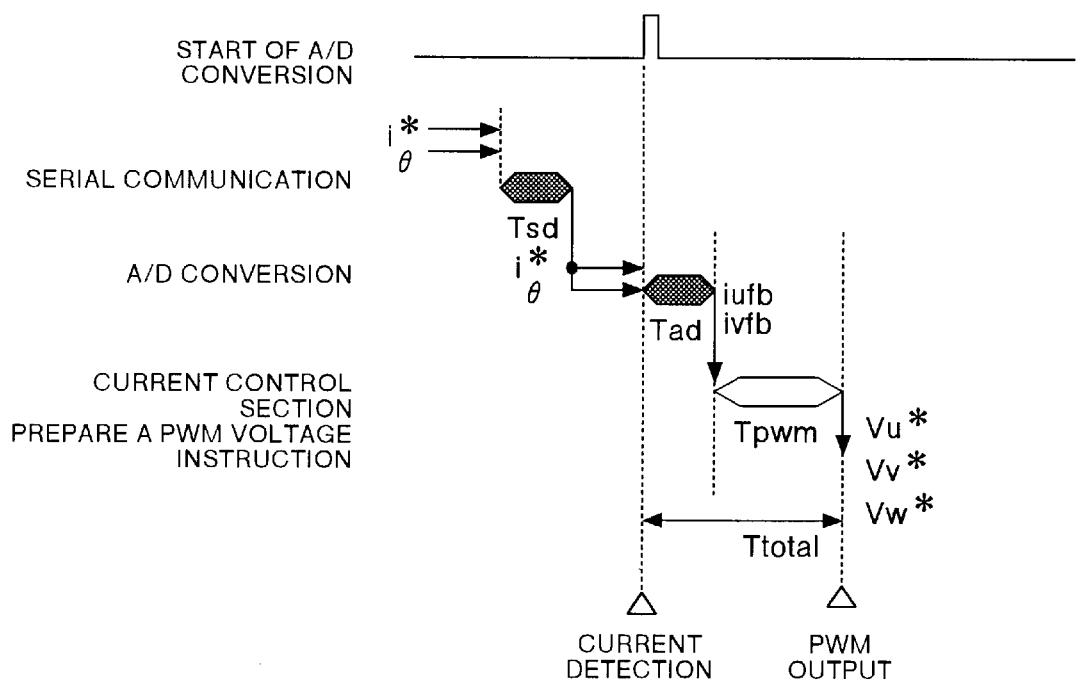
FIG. 2 is a timing chart showing timings of current control by the motor driving control apparatus in Embodiment 1.

With the configuration described above, as shown in FIG. 2, before starting of A/D conversion for current detection, a current instruction i* and a positional signal θ can be transmitted from the external interface section 100 to the current control section 15 in the N potential control section 200 through serial communications.

With this feature, a time T total required from current detection till output of a PWM signal is only the time as expressed by the following equation, $T\text{total} = \text{A/D converting time } (Tad)$ +PWM voltage instruction preparing time (Tpwm). Therefore, a time required from current detection till output of a PWM voltage instruction can be reduced by a delay time Tsd in serial communications for transmitting PWM voltage instructions from the external interface section 100 to the N potential control section 200 as compared to the time based on the conventional technology. This time reduction allows response to a current to be speeded up. In addition, the need for an insulating amplifier for current detection is eliminated, which allows influence of noise due to transmission of analog signals to be suppressed and a packaging area to be made smaller.

Figure 3:
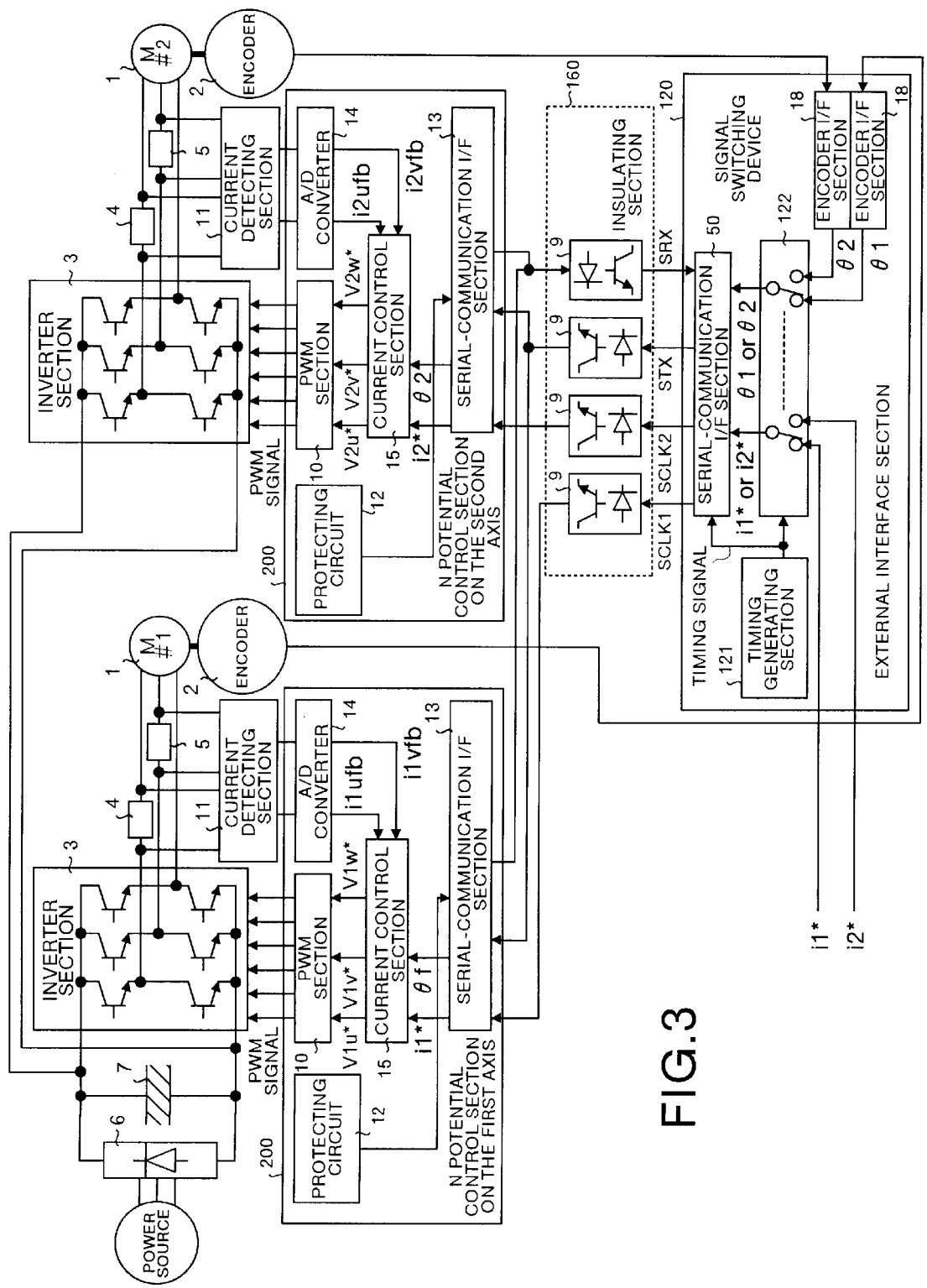
FIG. 3 is a block diagram showing Embodiment 2 of the motor driving control apparatus according to the present invention.

FIG. 3 shows Embodiment 2 of the motor driving control apparatus according to the present invention. In FIG. 3, the same reference numerals are assigned to the components corresponding to those in FIG. 1, and description thereof is omitted herein.

Embodiment 2 is realized with the apparatus in Embodiment 1 applied as a multi-axis motor driving control apparatus for controlling a plurality of motors 1 (#1, #2) to be driven, and an N potential control section 200 comprising a PWM section 10, a protecting circuit 12, a serial-communication I/F section 13, an A/D converter 14 for current detection signals, and a current control section 15 is provided for each of the motors 1 (#1, #2). The reference numeral #1 shows a first-axis motor and #2 shows a second-axis motor.

With this feature, a current detected value of each of the motors 1 (#1, #2) on each axis is directly inputted from the A/D converter 14 into the current control section 15 for each of the motors 1 (#1, #2 ). An encoder 2 as a position detector is connected to each of the motors 1 (#1, #2), and an inverter section 3, detection resistors 4, 5, and a current detecting section 11 are provided for each of the motors 1 (#1, #2). Further, as shown in the same figure, a diode module 6 and a smoothing capacitor 7 are commonly used between both of the motors 1 (#1, #2).

An external interface section 120 comprises encoder I/F sections 18 for each of the motors 1 (#1, #2) each as a positional signal input section for receiving positional signals θ1 and θ2 from the encoders 2 of each of the motors 1 (#1, #2), a serial-communication I/F section 50 for performing serial communications with an N potential control section 200 corresponding to each axis, a timing generating section 121, and a signal switching device 122. The external interface section 120 receives a current instruction i1* from the motor (#1) and a current instruction i2* from the another motor 1 (#2).

The timing generating section 121 generates a timing signal for selecting the axis (motor) to execute serial communications, and the signal switching device 122 alternately switches between a current instruction i1* from the motor 1 (#1 ) and a current instruction i2* from the another motor 1 (#2 ), and between a positional signal θ1 of the motor 1 (#1) and a positional signal θ2 of the motor 1 (#2) according to the generated signal. The serial-communication I/F section 50 alternately decides whether communications should be established with the N potential control section 200 corresponding to the first axis or with the N potential control section 200 corresponding to the second axis according to a timing signal generated by the timing generating section 121.

The insulating section 160 is shared with the plurality of motors 1 (#1, #2), and comprises four photocouplers 9 for transmitting a clock signal (SCLK1) for synchronizing clocks between the external interface section 120 and the N potential control section 200 corresponding to the first axis, transmitting a clock signal (SCLK2) for synchronizing clocks between the external interface section 120 and the N potential control section 200 corresponding to the second axis, transmitting current instructions i1*, i2* as well as positional signals θ1, θ2 or the like (STX), and transmitting alarm information or the like (SRX) from the N potential control section 200 corresponding to each axes.

With the configuration as described above, current instructions i1*, i2* from the motors each selected by the signal switching device 122 as well as positional signals θ1, θ2 of the motors each inputted into the encoder I/F section 18 as a positional signal input section can be transmitted to the N potential control section 200 corresponding to a motor through serial communications via the insulating section 160.

Figure 4:
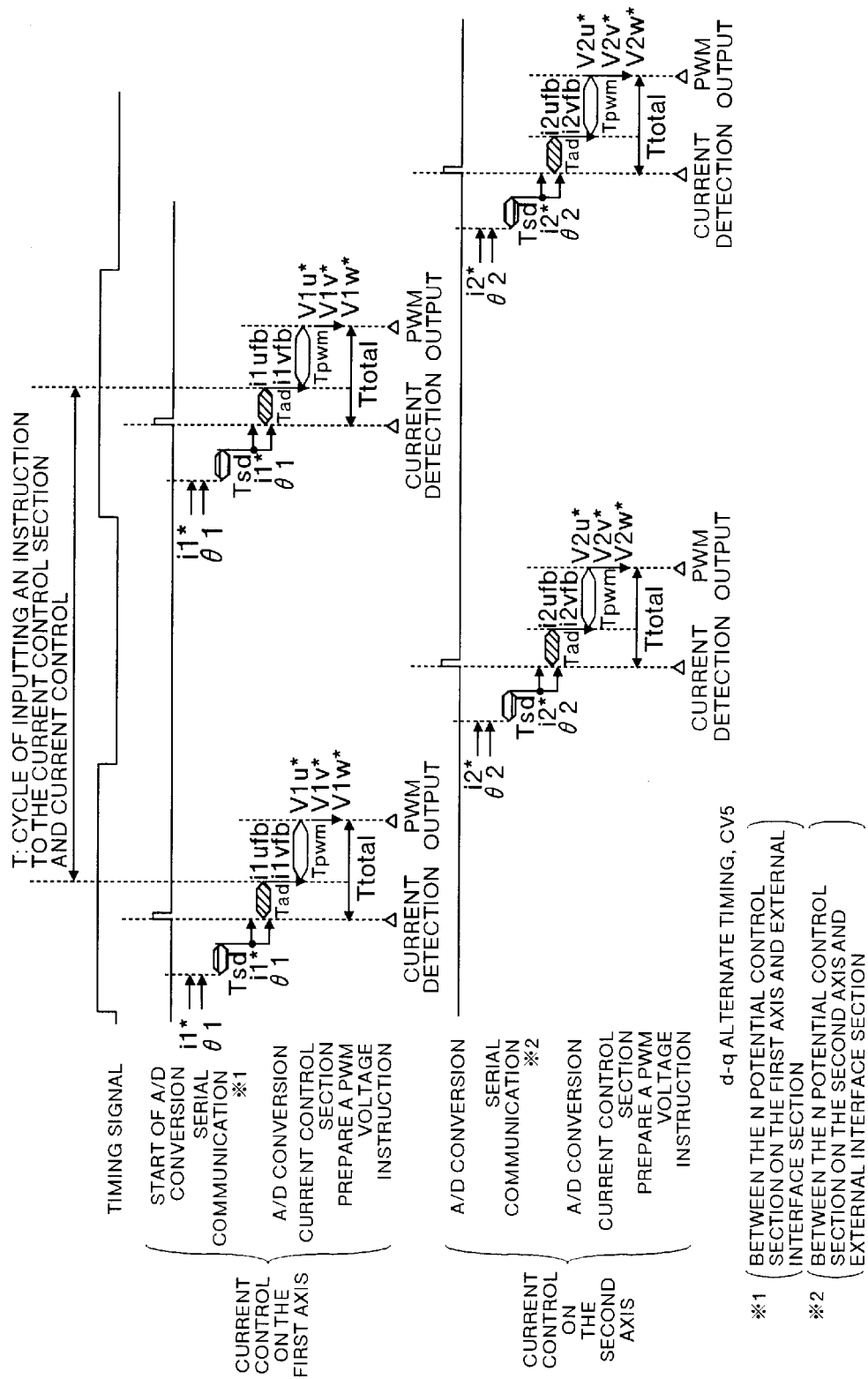
FIG. 4 is a timing chart showing timings of current control by the motor driving control apparatus in Embodiment 2.

In this embodiment, as shown in FIG. 4, before starting of A/D conversion for current detection, a current instruction i1* (or i2*) and a positional signal θ1 (or θ2) can also be transmitted from the external interface section 120 to the current control section 15 in the N potential control section 200 through serial communications.

With this feature, a time T total required from current detection till output of a PWM signal is only the time as expressed by the following equation, $$T\text{total} = A/D \text{ converting time } (T\text{ad})$$

+PWM voltage instruction preparing time (Tpwm). Therefore, a time required from current detection till output of a PWM voltage instruction can be reduced by a delay time Tsd in serial communications for transmitting PWM voltage instructions from the external interface section 100 to the N potential control section as compared to the time based on the conventional technology. This reduction in the time allows response to a current to be speeded up. In addition, this case can also eliminate the need for an insulating amplifier for current detection, which allows influence of noise due to transmission of analog signals to be suppressed.

Furthermore, the signal switching device 122 alternately switches serial communications between the N potential control section 200 corresponding to the first axis and the external interface section 120 to serial communications between the N potential control section 200 corresponding to the second axis and the external interface section 120 and vice versa based on the timing signal. Therefore, a current to each axis can be controlled without making the number of photocouplers 9 in the insulating section 160 and the number of external interface section 120 twice (or a multiple of the number of motor axes). In other words, it is not necessary to provide a photocoupler and an external interface section discretely for each motor on each axis.

Figure 5:
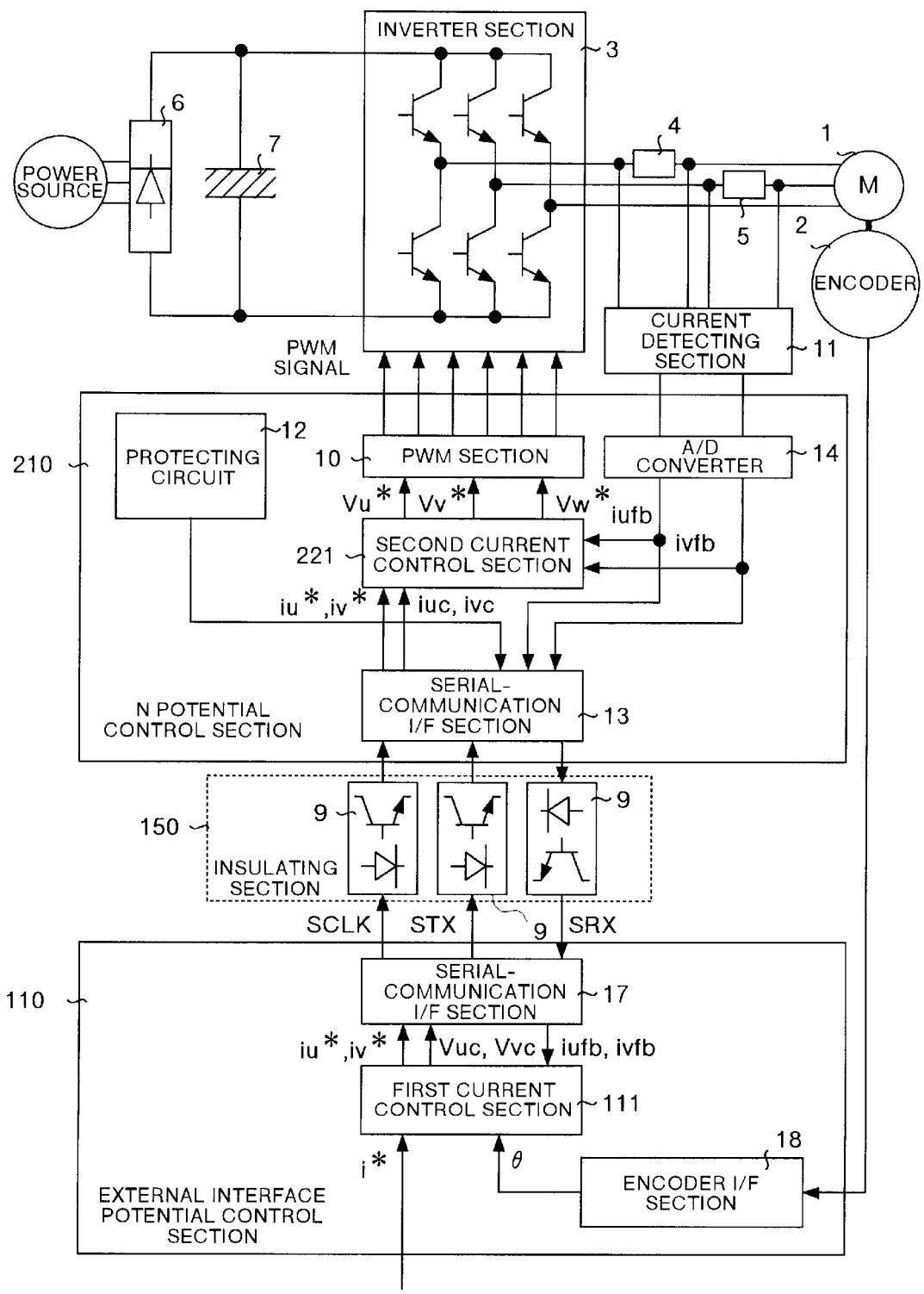
FIG. 5 is a block diagram showing Embodiment 3 of the motor driving control apparatus according to the present invention.

FIG. 5 shows Embodiment 3 of the motor driving control apparatus according to the present invention. The motor driving control apparatus according to Embodiment 3 has a first current control section 111 for an integration operation provided in an external interface potential control section 110 and a second current control section 221 for proportional operation provided in an N potential control section 210. These potential control sections 110 and 210 are connected to each other through serial communications.

In summary, the N potential control section 210 comprises a PWM section 10, a protecting circuit 12, a serial-communication I/F section 13, an A/D converter 14 for current detection signals, and the second current control section 221. The external interface potential control section 110 comprises a serial-communication I/F section 17, an encoder I/F section 18, and the first current control section 111.

In this embodiment, an A/D converter 14 for A/D-converting a current detected value is incorporated in the N potential control section 210 to omit an insulating amplifier from an insulating section. Current feedback values iufb, ivfb A/D-converted by the A/D converter 14 are inputted into the second current control section 221 provided in the N potential control section 210 and also transmitted to the first current control section 111 provided in the external interface potential control section 110 through serial communications.

The first current control section 111 receives a current instruction i* and a positional signal θ, further receives current feedback values iufb, ivfb A/D converted by the A/D converter 14 in the N potential control section 210 through serial communications. The first current control section 111 subjects the values to an integration operation and some other operations such as inductive voltage correction and dead time correction as required, and transmits U-phase and V-phase current instructions iu*, iv* and current-control correction values Vuc, Vvc to the N potential control section 210 through serial communications.

Figure 6:
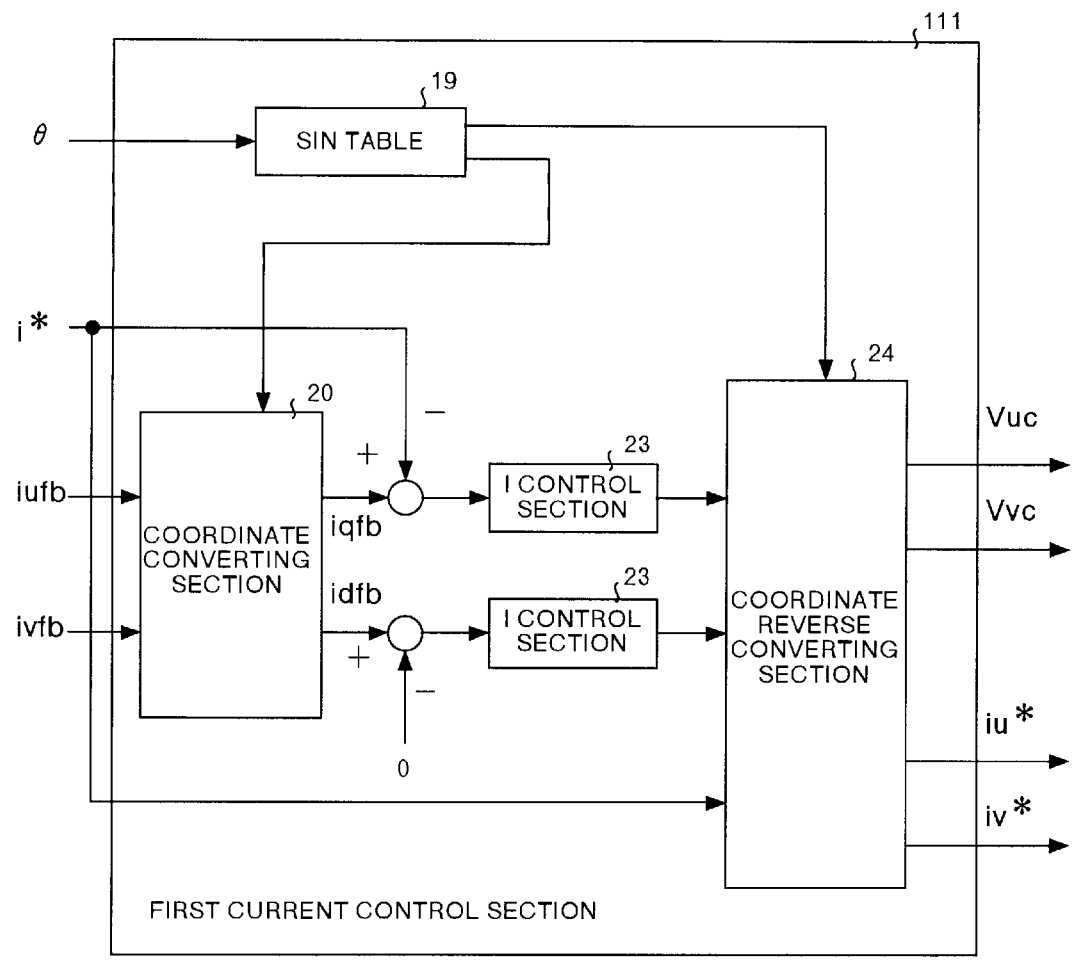
FIG. 6 is a block diagram showing internal configuration of a first current control section used in the motor driving control apparatus in Embodiment 3.

FIG. 6 shows internal configuration of the first current control section 111. The first current control section 111 inputs a SIN value from a SIN table 19 to a coordinate converting section 20 and a coordinate reverse converting section 24 according to a positional signal θ of a motor. The coordinate converting section 20 converts current feedback values iufb, ivfb from values on the U-V coordinate axes to values iqfb, idfb on the d-q coordinate axes. The coordinate converting section inputs deviation between the current instruction i* and the current feedback value iqfb on the q-axis into an I control section 23 and also inputs deviation between zero and the current feedback value idfb on the d-axis into another I control section 23. Each of the I control sections (integration controller) 23 on each axis subjects the inputted data to an ordinary integration operation and outputs a result of integration operation to the coordinate reverse converting section 24. The coordinate reverse converting section 24 reverse converts the result to values on the U-V coordinate axes, and outputs U-phase and V-phase current instructions iu*, iv* and current-control correction values Vuc, Vvc.

The second current control section 221 receives the U-phase and V-phase current instructions iu*, iv*, current-control correction values Vuc, Vvc, and current feedback values iufb, ivfb, subjects the values to proportional operation, adds current-control correction terms Vuc, Vvc, Vwc as output for integration control to the proportion-controlled output, and outputs the voltage instructions (Vu*, Vv*, Vw*) to the PWM section 10.

Figure 7:
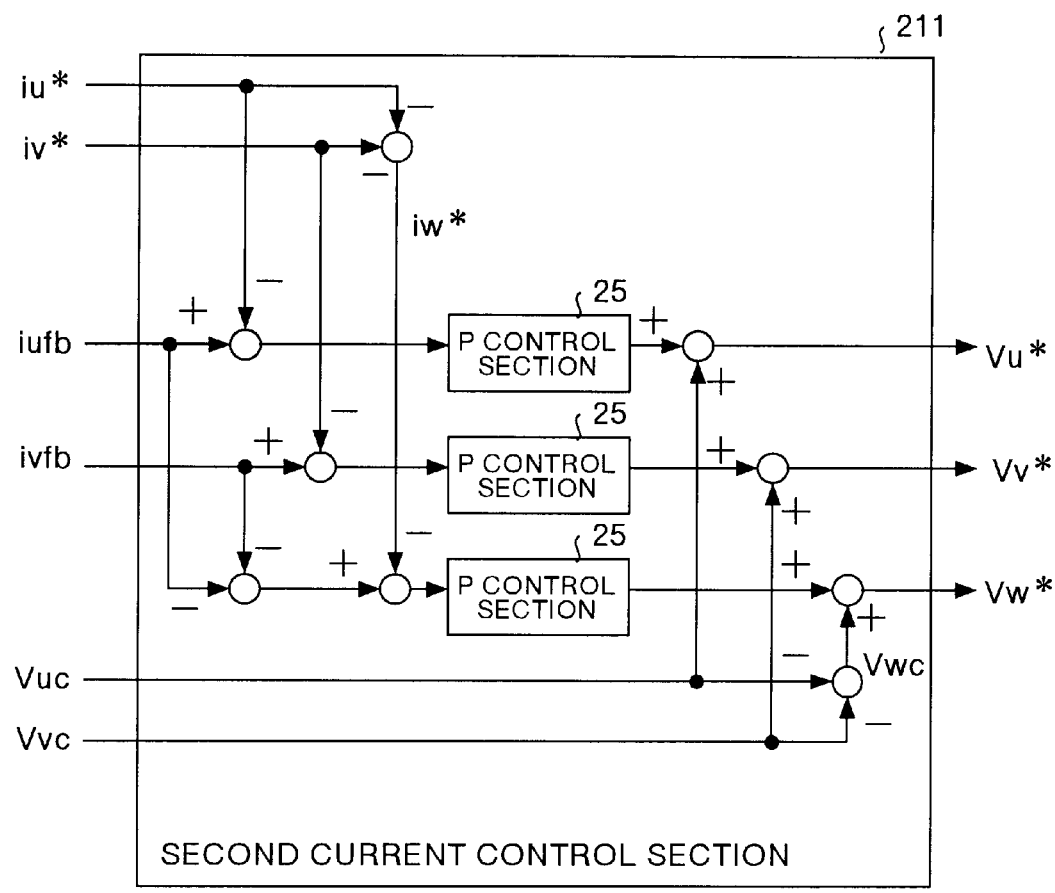
FIG. 7 is a block diagram showing internal configuration of a second current control section used in the motor driving control apparatus in Embodiment 3.

FIG. 7 shows internal configuration of the second current control section 211. The second current control section 211 inputs each deviation between current instructions iu*, iv* and current feedback values iufb, ivfb to P control sections (proportion controller) 25 in each phase for performing proportional operation respectively, adds current-control correction terms Vuc, Vvc, Vwc as output for integration control to outputs (proportion-controlled outputs) from the P control sections 25, and outputs the voltage instructions (Vu*, Vv*, Vw*) in each phase. A W-phase current instruction, a current feedback value, and a voltage instruction are computed from the fact that a sum of three phases is zero.

In Embodiment 3, because of a characteristic that the integration operation reflects a previous result into the succeeding computation, the integration operation does not require such response as the proportion control requires and also does not contribute to instant response such that the proportion control does, therefore, the integration operation is executed through serial communications. Therefore, the integration operation can be executed at any time other than the time from current detection till output of the PWM voltage instructions.

Figure 8:
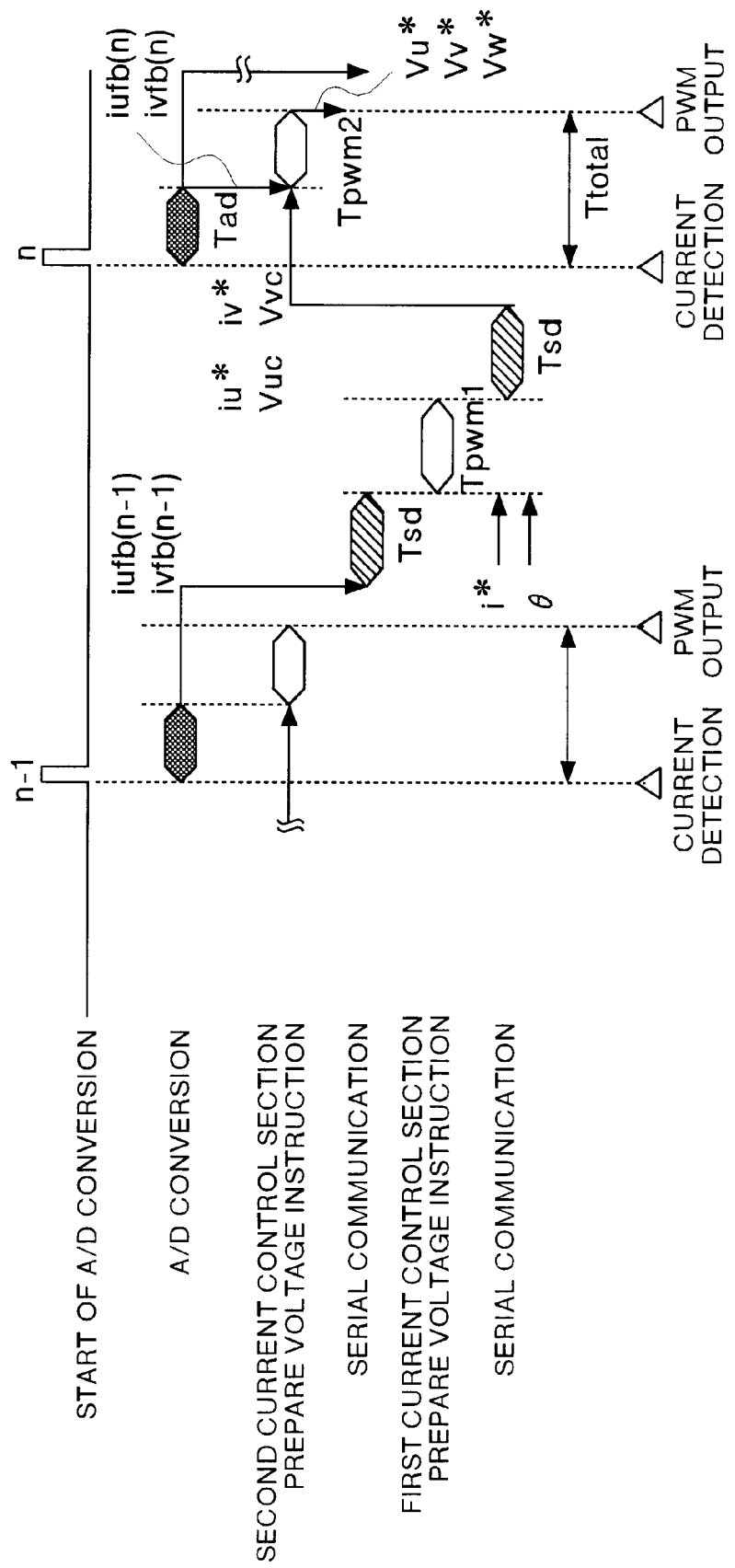
FIG. 8 is a timing chart showing timings of current control by the motor driving control apparatus in Embodiment 3.

Next description is made for a timing of current control by the motor driving control apparatus according to Embodiment 3 with reference to the timing chart shown in FIG. 8. Current feedback values iufb (n−1), ivfb (n−1) or the like of immediately preceding (n−1)sampling are transmitted to the external interface potential control section 110 through serial communications by the time A/D conversion for n-th sampling is started, and the first current control section 111 in the external interface potential control section 110 provides controls for integration of a current. In this case, the time required for the integration operation is represented as Tpwm1.

The first current control section 111 serially transmits U-phase and V-phase current instructions iu*, iv* and current-control correction values Vuc, Vvc as output therefrom to the N potential control section 210. The second current control section 221 in the N potential control section 210 executes proportional current control by using the current feedback values iufb(n), ivfb(n) of the n-th sampling. In this case, assuming that the time required for a proportional operation is represented as Tpwm2, the time T total from current detection till output of PWM signals is as expressed by the following equation, $$T\text{total} = T_{ad} + T_{pwm2}.$$

This time is equivalent only to the A/D converting time as well as the time require for a proportional operation. Therefore, if a parallel operation is executed by a logic, the time from current detection till output of PWM signals can largely be reduced as compared to the time based on the conventional technology. Furthermore, in this embodiment, the need for providing an insulating amplifier for current detection is also eliminated, which allows influence of noise due to transmission of analog signals to be suppressed and a packaging area to be made smaller.

Figure 9:
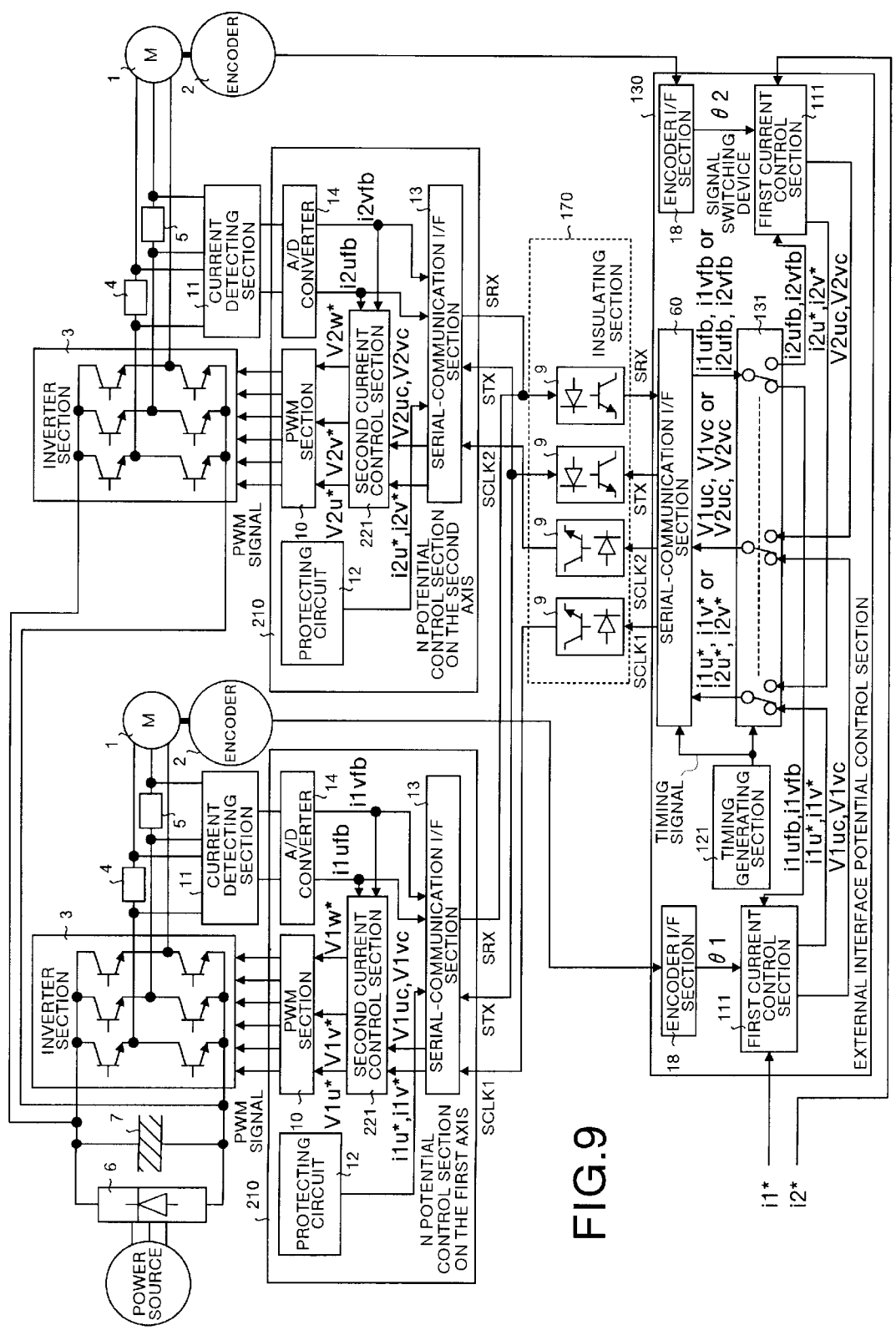
FIG. 9 is a block diagram showing Embodiment 4 of the motor driving control apparatus according to the present invention.

FIG. 9 shows Embodiment 4 of the motor driving control apparatus according to the present invention. In FIG. 9, the same reference numerals are assigned to the components corresponding to those in FIG. 5, and description thereof is omitted herein.

Embodiment 4 is realized with the apparatus in Embodiment 3 applied as a multi-axis motor driving control apparatus for controlling a plurality of motors 1 (#1, #2) to be driven, and an N potential control section 210 comprising a PWM section 10, a protecting circuit 12, a serial-communication I/F section 13, an A/D converter 14 for current detection signals, and a second current control section 221 for performing a proportional operation is provided for each of the motors 1 (#1, #2). The reference numeral #1 shows a first-axis motor and #2 shows a second-axis motor. With this feature, each current detected value of the motors (#1, #2) on each axis is directly inputted from the A/D converter 14 to the current detecting section 11 for each of the motors 1 (#1, #2).

The external interface potential control section 130 comprises encoder I/F sections 18 for each of the motors 1 (#1, #2) each as a positional signal input section for receiving positional signals θ1 and θ2 from the encoders 2 of each of the motors 1 (#1, #2), a first current control section 111 for each of the motors 1 (#1, #2), a serial-communication I/F section 60 for performing serial communications with an N potential control section 200 corresponding to each axis, a timing generating section 121, and a signal switching device 122. The external interface potential control section 130 receives a current instruction i1* from the motor 1 (#1) and a current instruction i2* from another motor 1 (#2).

The first current control section 111 corresponding to the first axis receives a current instruction i1* and a positional signal θ1, receives the current feedback values i1ufb, i1vfb A/D converted by the A/D converter 14 in the N potential control section 210 through serial communications. The first current control section 111 subjects these values to an integration operation and some other operations such as inductive voltage correction or dead time correction as required. Then this first current control section 111 transmits, under the switching operation by the signal switching device 131, U-phase and V-phase current instructions i1u*, i1v* and current-control correction values V1uc, V1vc to the N potential control section 210 corresponding to the first axis through serial communications.

Similarly, the first current control section 111 corresponding to the second axis receives a current instruction i2* and a positional signal θ2, receives the current feedback values i2ufb, i2vfb A/D converted by the A/D converter 14 in the N potential control section 210 through serial communications. The first current control section 111 subjects these values to an integration operation and some other operations such as inductive voltage correction or dead time correction as required. Then this first current control section 111 transmits, under the switching operation by the signal switching device 131, U-phase and V-phase current instructions i2u*, i2v* and current-control correction values V2uc, V2vc to the N potential control section 210 corresponding to the second axis through serial communications.

The timing generating section 121 generates, similarly to that in Embodiment 2, a timing signal for selecting the axis (motor) to execute serial communications. The signal switching device 131 alternately switches, based on the generated timing signal, between current feedback values i1ufb, i1vfb for the motor 1 (#1) and current feedback values i2ufb, i2vfb for the motor 1 (#2) ,and also alternately switches between a current instruction i1* for the motor 1 (#1) and a current instruction i2* for the motor 1 (#2), and between current-control correction values V1uc, V1vc for the motor 1 (#1) and current-control correction values V2 uc, V2 vc for the motor 1 (#2). The serial-communication I/F section 60 alternately decides whether communications should be established with the N potential control section 210 corresponding to the first axis or with the N potential control section 210 corresponding to the second axis according to a timing signal generated by the timing generating section 121.

The insulating section 170 is shared with a plurality of motors 1 (#1, #2) in the same manner as the apparatus of Embodiment 2. This insulating section 170 comprises four photocouplers 9 for transmitting a clock signal (SCLK1) for synchronizing clocks between the external interface potential control section 130 and the N potential control section 210 corresponding to the first axis, transmitting a clock signal (SCLK2) for synchronizing clocks between the external interface potential control section 130 and the N potential control section 210 corresponding to the second axis, transmitting current instructions i1*, i2* and current-control correction values V1uc, V1vc, V2uc, and V2vc or the like (STX), and transmitting alarm information or the like (SRX) from the N potential control section 210 corresponding to each axes.

With the configuration as described above, current-control correction values V1uc, V1vc, V2uc, and V2vc and current instructions i1*, i2* for the motors 1 (#1, #2) each selected by the signal switching device 131 can be transmitted to the second current control section 221 for a corresponding motor through serial communications via the insulating section 170 according to time division by each current control section for each of the motors 1 (#1, #2).

In this embodiment, similarly to Embodiment 3, because of a characteristic that the integration operation reflects a previous result into the succeeding computation, the integration operation does not require such response as the proportion control requires and also does not contribute to instant response such that the proportion control does, therefore, the integration operation is executed through serial communications. Therefore, the integration operation can be executed at any time other than the time from current detection till output of the PWM voltage instructions.

Figure 10:
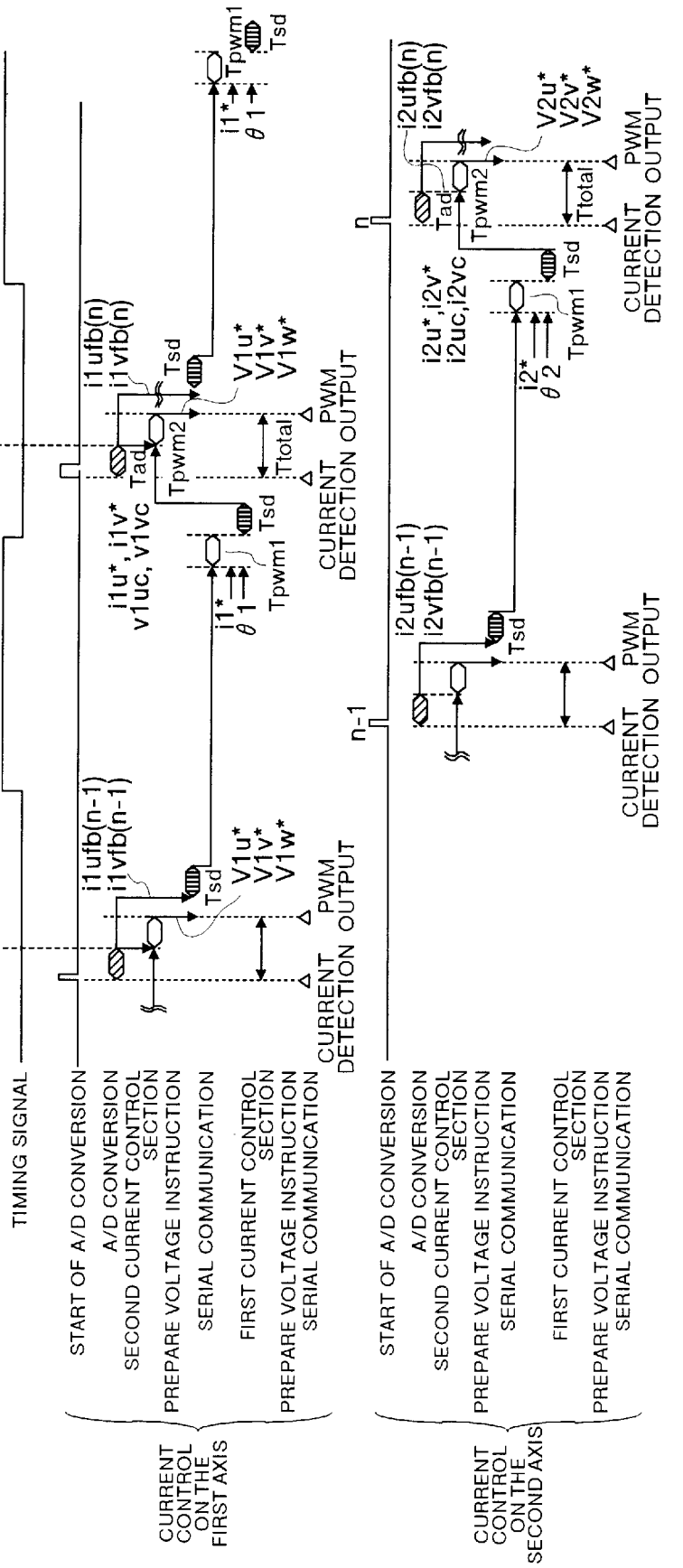
FIG. 10 is a timing chart showing timings of current control by the motor driving control apparatus in Embodiment 4.
Figure 11:
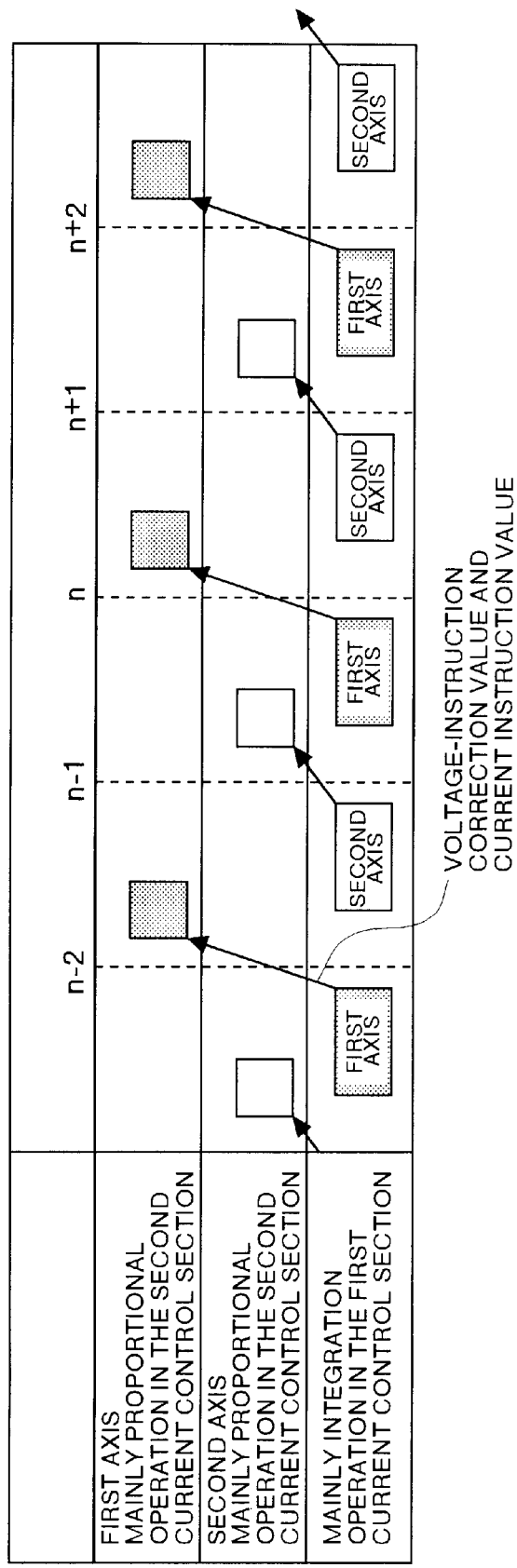
FIG. 11 is a timing chart showing timings of processing by the motor driving control apparatus in Embodiment 4.

Next description is made for a timing of current control by the motor driving control apparatus according to Embodiment 4 with reference to the timing chart shown in FIG. 10. It should be noted that the current control on the first axis and the current control on the second axis are the same operation as each other except that these controls are performed alternately operation according to timing signals generated by the timing generating section 121. Therefore, the current control on the first axis will only be explained here. FIG. 11 shows timings of processing in Embodiment 4.

Current feedback values i1ufb(n−1), i1vfb(n−1) or the like of immediately preceding i.e. the (n−1)sampling are transmitted from the N potential control section 210 corresponding to the first axis to the external interface potential control section 130 through serial communications by the time A/D conversion for n-th sampling is started. Then the first current control section 111 in the external interface potential control section 130 corresponding to the first axis mainly provides controls for integration of a current. In this case, the time required for an integration operation is represented as Tpwm1.

The first current control section 111 serially transmits U-phase and V-phase current instructions i1u*, i1v* and the current-control correction values V1uc, V1vc corresponding to the first axis as output therefrom to the N potential control section 210 corresponding to the first axis. The second current control section 221 in the N potential control section 210 executes proportional current control by using the current feedback values i1ufb(n), i1vfb(n) of the n-th sampling. In this case, assuming that the time required for a proportional operation is represented as Tpwm2, the time from current detection till output of PWM signals is as expressed by the following equation, $$T\text{total}=T_{ad}+T_{pwm2}.$$

Thus, the time required from current detection till output of PWM signals is only the time required for A/D conversion as well as for a proportional operation. Therefore, if a parallel operation is executed by a logic, the time from current detection till output of PWM signals can largely be reduced as compared to the time based on the conventional technology. Furthermore, in this embodiment, the need for providing an insulating amplifier for current detection is also eliminated, which allows influence of noise due to transmission of analog signals to be suppressed and a packaging area to be made smaller.

Furthermore, serial communications between the N potential control section 210 corresponding to the first axis and the external interface potential control section 130 is alternately switched to serial communications between the N potential control section 210 corresponding to the second axis and the external interface potential control section 130 and vice versa according to a timing signal, so that a current to two axes can be controlled without making a number of photocouplers in the insulating section 170 and an external interface section 120 double.

Because of a characteristic that an integration operation reflects a previous result to following computation, the integration operation does not require such response that proportion control requires, and also does not contribute to instant response such that the proportion control does, therefore, the integration operation is executed through serial communications. Furthermore, by noting the property that the instant response can be improved when a cycle of proportion control is shorter, the cycle of proportion control without using serial communications can be made shorter than the cycle of the integration operation.

In other words, a current value detected by the current detecting section can directly be inputted into the second current control section in the N potential control section according to a detection cycle of a current value; serial communications of the received current detected value to the first current control section 111 can be executed according to a slower cycle than the detection cycle of the current value; a current-control correction value and a current instruction value can be prepared in the first current control section 111 according to a serial-communication cycle of the current detected value, and serial communications of the current-control correction value and current instruction value prepared in the first current control section to the second current control section 221 can be executed according to the detection cycle of the current value.

Figure 12:
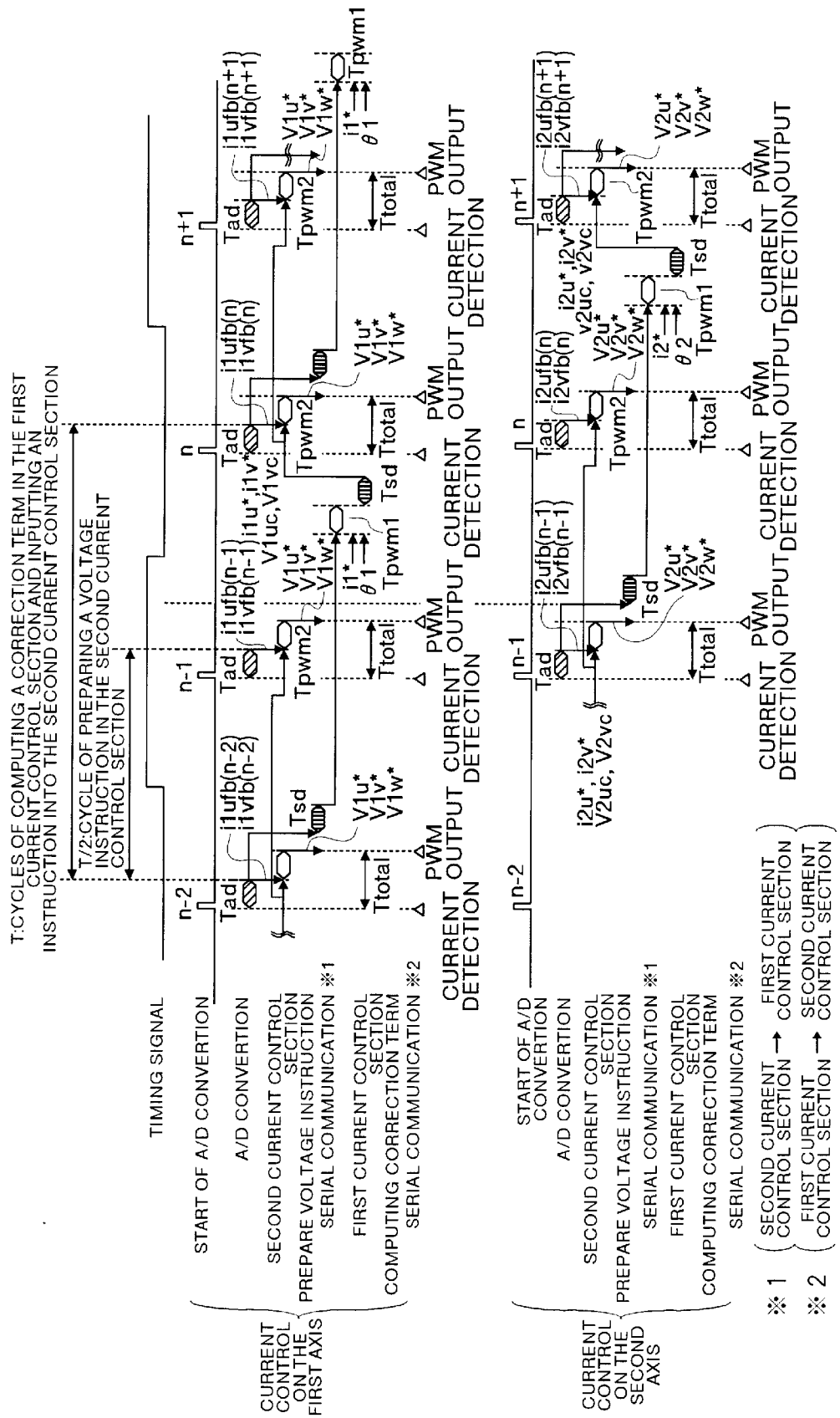
FIG. 12 is a timing chart showing timings of another current control by the motor driving control apparatus in Embodiment 4.
Figure 13:
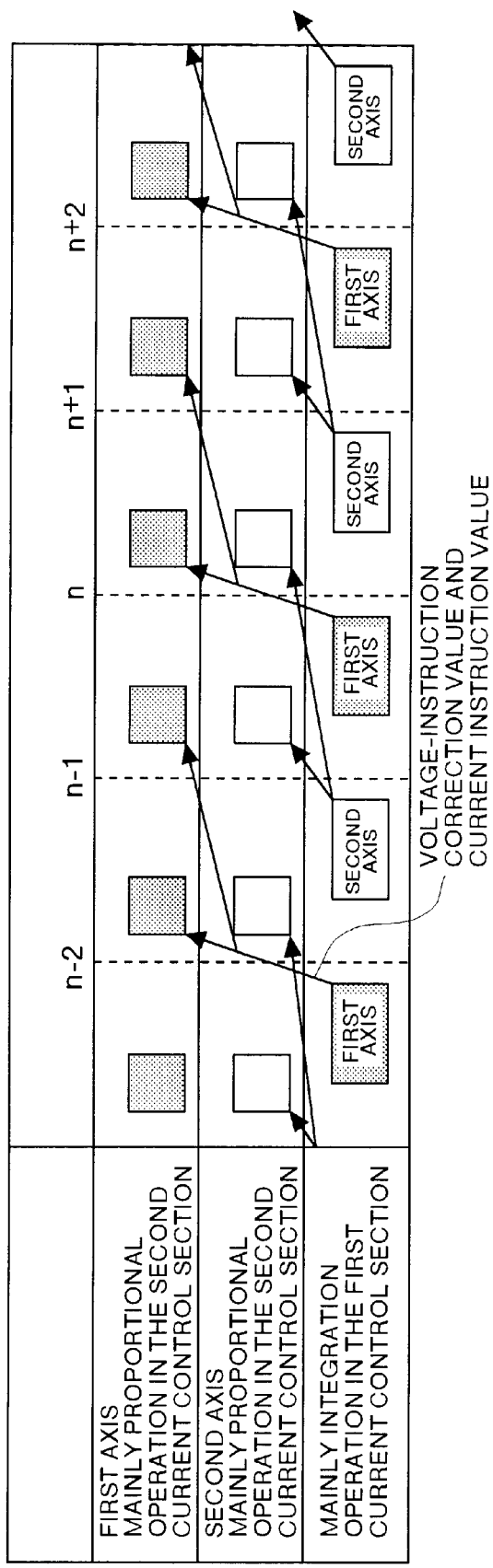
FIG. 13 is a timing chart showing timings of another processing by the motor driving control apparatus in Embodiment 4.
Figure 14:
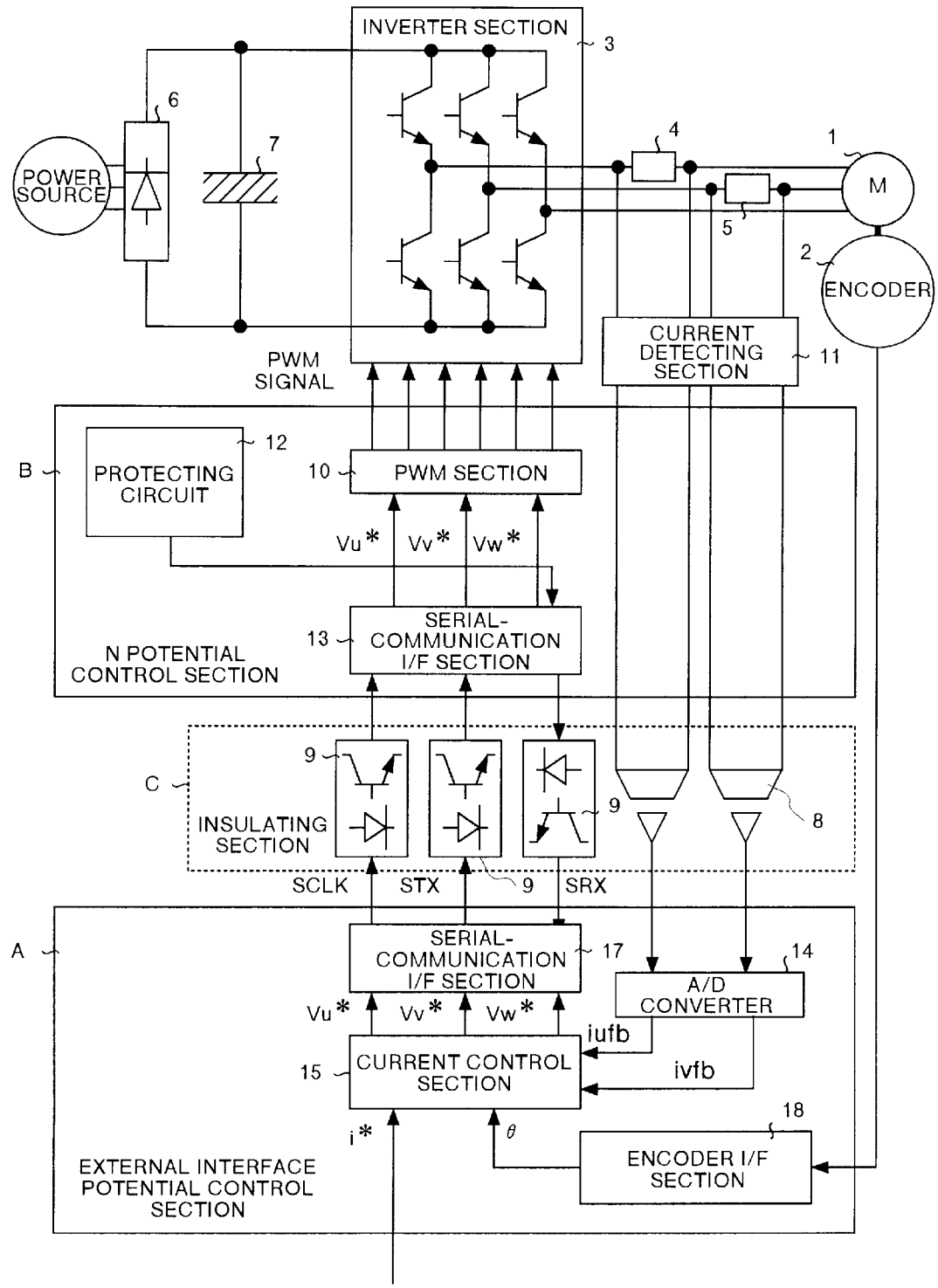
FIG. 14 is a block diagram showing the motor driving control apparatus based on the conventional technology.
Figure 15:
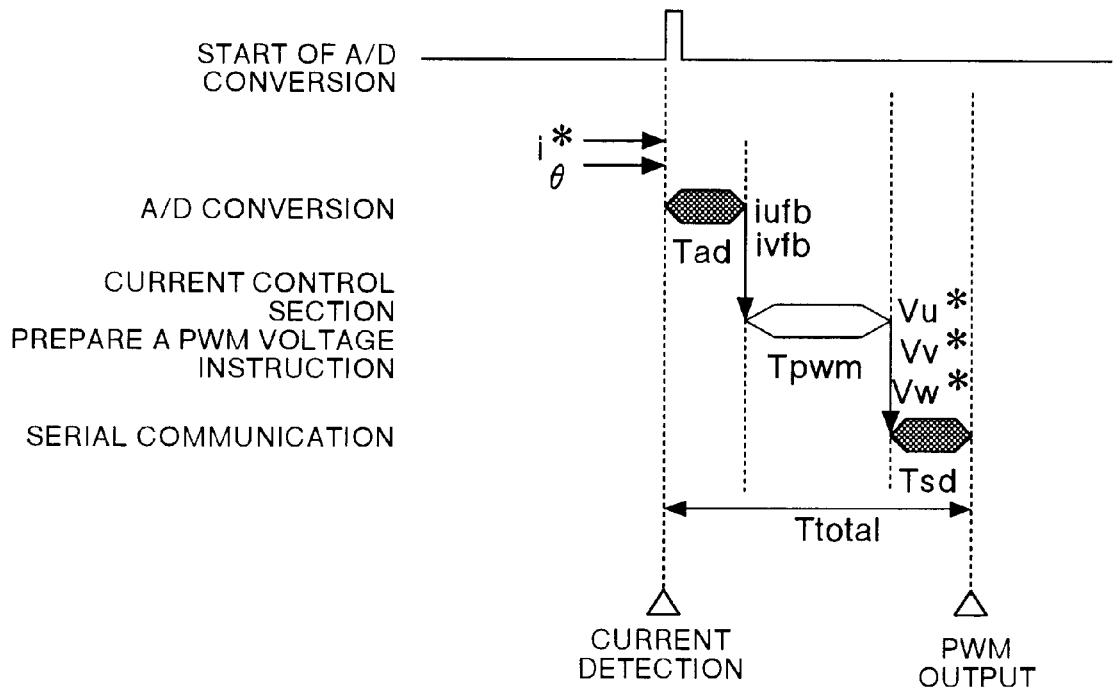
FIG. 15 is a timing chart showing timings of current control by the motor driving control apparatus based on the conventional technology.
Figure 16:
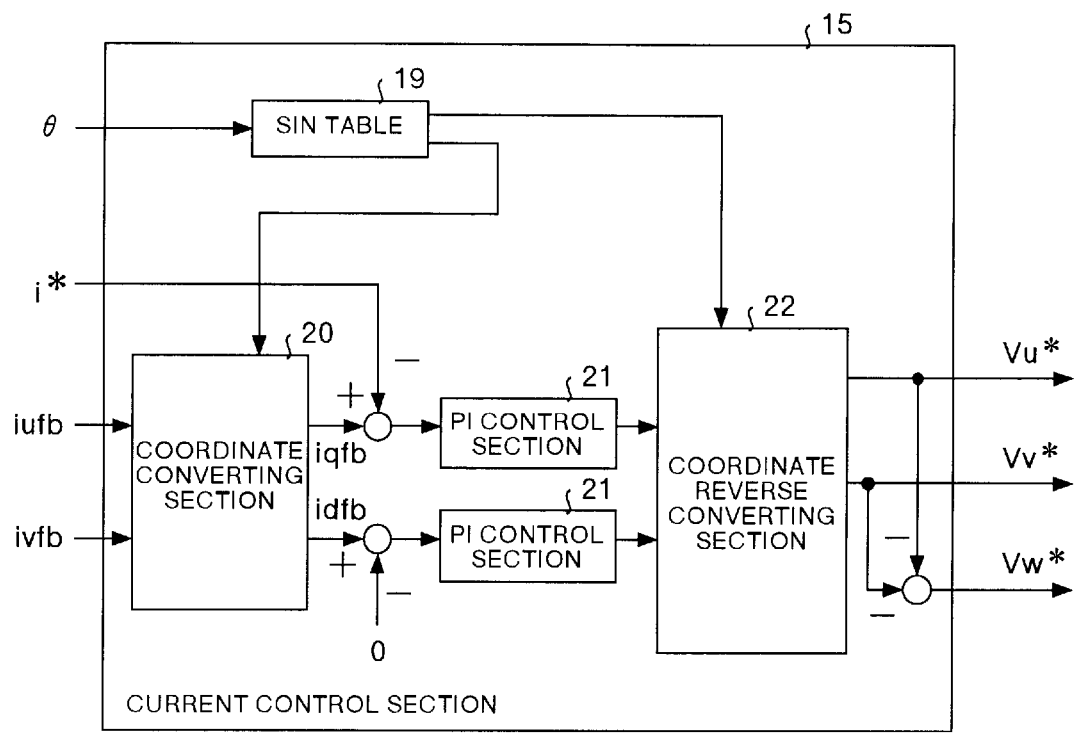
FIG. 16 is a block diagram showing internal configuration of a current control section used in the motor driving control apparatus based on the conventional technology.

Description is made for a case where the operations are applied to controls for two axes with reference to a timing chart shown in FIG. 12 and a timing chart for processing shown in FIG. 13. It should be noted that the current control on the first axis and the current control on the second axis are performed in the same manner except that there is a time gap between them based on the timing signals generated by the timing generating section 121. Therefore, the current control on the first axis will only be explained here.

Current feedback values i1ufb(n−2), i1vfb(n−2) or the like of second (n−2) sampling before the current one are transmitted from the N potential control section 210 corresponding to the first axis to the external interface potential control section 130 through serial communications by the time A/D conversion for n-th sampling is started. The first current control section 111 on the first axis mainly provides controls for integration of a current. In this process, the time required for an integration operation is represented as Tpwm1.

The first current control section 111 serially transmits U-phase and V-phase current instructions i1u*, i1v* and current-control correction values V1uc, V1vc corresponding to the first axis as output therefrom to the N potential control section 210 corresponding to the first axis. The second current control section 221 in the N potential control section 210 executes proportional current control by using the current feedback values i1ufb(n), i1vfb(n) of the n-th sampling. In this case, assuming that the time required for a proportional operation is represented as Tpwm2, the time T total from current detection till output of PWM signals is as expressed by the following equation, $$T\text{total}=Tad+Tpwm2.$$

Then the second current control section 221 in the N potential control section 210 executes proportional current control by using the current feedback values i1ufb(n+1), i1vfb(n+1) according to (n+1)-th sampling, n-th U-phase and V-phase current instructions i1u*(n), i1v*(n), and n-th current-control correction values V1uc(n), V1vc(n).

Thus, Tpwm2 is only the time required for A/D conversion as well as for a proportional operation. Therefore, if a parallel operation is executed by a logic, the time from current detection till output of PWM signals can largely be reduced as compared to the time based on the conventional technology, and an operating cycle for proportion control can be made shorter without making shorter the communication cycle.

It is needless to say that this timing control can be applied to a single-axis apparatus shown in Embodiment 3 as well.

As described above, with the present invention, the current detecting section directly inputs a current detected thereby into the current control section in the N potential control section, and the external interface section transmits a current instruction and a positional signal inputted into the positional signal input section to the current control section through serial communications via the insulating section. Hence the current instruction and positional signal can be transmitted from the external interface section to the current control section in the N potential control section through serial communications before a current detected value is inputted into the current control section, so that a time required from current detection till output of the PWM signals can be reduced by a delay time in serial communications for transmitting PWM voltage instructions from the external interface section to the N potential control section as compared to the time based on the conventional technology and response to a current can be speeded up. In addition, the need for providing an insulating amplifier for current detection is eliminated, which allows influence of noise due to transmission of analog signals to be suppressed and a packaging area to be made smaller.

With the invention according to another aspect of the present invention, a plurality of N potential control sections and the external interface section can be linked through serial communications by sharing the insulating section therewith. Hence a multi-axis motor driving control apparatus can be realized only with slight increase in a circuit scale of the insulating section and external interface section. Also the time from current detection till output of PWM voltage instructions can be reduced by a time for serial communications, which allows response to a current to be speeded up.

With the invention according to another aspect of the present invention, the first current control section creates a current-control correction value and a current instruction value by means of integration operations according to a current instruction received from outside, a received current detected value, and a positional signal inputted into a positional signal input section; and the second current control section receives the current-control correction value and the current instruction value created in the first current control section through serial communications via the insulating section. Then the second current control section performs proportional operation according to the current instruction value inputted from the first current control section as well as the directly inputted current detected value, and creates a voltage instruction to be outputted to a PWM section from the result of this operation, the current-control correction value inputted from the first current control section, and also from the directly inputted current detected value. Hence the integration operation that does not contribute to instant response such that proportion control does can be executed at any time other than the time from current detection till output of PWM voltage instructions and response to a current can be speeded up by a time for an integration operation. In addition, the need for providing a insulating amplifier for current detection is eliminated, which allows influence of noise due to transmission of analog signals to be suppressed and a packaging area to be made smaller.

With the invention according to another aspect of the present invention, only the proportional operation which does not use the serial communications is executed at a shorter cycle as compared to the cycle of the integration operation. Hence a time from current detection till output of PWM voltage instructions can be reduced by a time for serial communications as well as by a time for the integration operation. This time for current detection can largely be reduced because time is required only for A/D conversion and proportional operation, and a proportional operation cycle effective in enhancement of current response can be reduced, which allows response to a current to be speeded up.

With the invention according to another aspect of the present invention, a plurality of current control sections are separated into the first current control section for executing integration operation in an external interface section and the second current control section for executing proportional operation in the N potential control section, and the two sections are linked to each other through serial communications via an insulating section shared therewith. Hence a multi-axis motor driving control apparatus can be realized only with slight increase in a circuit scale of the insulating section and external interface section. Also the time from current detection till output of PWM voltage instructions can be reduced by a time for serial communications as well as by a time for an integration operation. This time for current detection can largely be reduced because time is required only for A/D conversion and proportional operation, which allows response to a current to be speeded up.

With the invention according to another aspect of the present invention, a plurality of current control sections are separated into the first current control section for executing integration operation in the external interface section and the second current control section for executing proportional operation in the N potential control section, and the two sections are linked to each other through serial communications via an insulating section shared therewith, and serial communications of the current-control correction value and current instruction value prepared in the first current control section to the second current control section are executed according to time division by each current control section for each of the motors. Hence a multi-axis motor driving control apparatus can be realized only with slight increase in a circuit scale of the insulating section and external interface section. Also the time from current detection till output of PWM voltage instructions can be reduced by a time for serial communications as well as by a time for an integration operation. This time for current detection can largely be reduced because the time is required only for A/D conversion and proportional operation, which allows response to a current to be speeded up.

With the invention according to another aspect of the present invention, there are steps of directly inputting a current detected by the current detecting section into the current control section in the N potential control section, inputting a positional signal from a position detector into the positional signal input section provided in the external interface section, and transmitting a current instruction and the positional signal inputted into the positional signal input section from the external interface section to the current control section in the N potential control section through serial communications via the insulating section before a current detected value is directly inputted thereinto. Hence a time required from current detection till output of PWM signals can be reduced by a delay time in serial communications for transmitting PWM voltage instructions from the external interface section to the N potential control section as compared to the time based on the conventional technology, and response to a current can be speeded up. In addition, the need for providing an insulating amplifier for current detection is eliminated, which allows influence of noise due to transmission of analog signals to be suppressed and a packaging area to be made smaller.

With the invention according to another aspect of the present invention, there is a step of linking a plurality of N potential control sections to the external interface section through serial communications by sharing the insulating section therewith. Hence a multi-axis motor driving control apparatus can be realized only with slight increase in a circuit scale of the insulating section and external interface section. Also the time from current detection till output of PWM voltage instructions can be reduced by a time for serial communications, which allows response to a current to be speeded up.

With the invention according to another aspect of the present invention, the first current control section creates a current-control correction value and a current instruction value by means of integration operations according to a current instruction received from outside, a received current detected value, and a positional signal inputted into a positional signal input section; and the second current control section receives the current-control correction value and the current instruction value created in the first current control section through serial communications via an insulating section. Then the second current control section performs proportional operation according to the current instruction value inputted from the first current control section as well as the directly inputted current detected value, and creates a voltage instruction to be outputted to a PWM section from the result of this operation, the current-control correction value inputted from the first current control section, and also from the directly inputted current detected value. Hence the integration operation that does not contribute to instant response such that proportion control does can be executed at any time other than the time from current detection till output of PWM voltage instructions and response to a current can be speeded up by a time for an integration operation. In addition, the need for providing a insulating amplifier for current detection is eliminated, which allows influence of noise due to transmission of analog signals to be suppressed and a packaging area to be made smaller.

With the invention according to another aspect of the present invention, only the proportional operation which does not use the serial communications is executed at a shorter cycle as compared to the cycle of the integration operation. Hence a time from current detection till output of PWM voltage instructions can be reduced by a time for serial communications as well as by a time for the integration operation. This time for current detection can largely be reduced because the time is required only for A/D conversion and proportional operation, and a proportional operation cycle effective in enhancement of current response can be reduced, which allows response to a current to be speeded up.

With the invention according to another aspect of the present invention, there are steps of separating the plurality of current control sections into the first current control section for executing an integration operation in the external interface section and the second current control section for executing an proportional operation in the N potential control section, linking the separated sections to each other through serial communications via the insulating section shared therewith. Hence a multi-axis motor driving control apparatus can be realized only with slight increase in a circuit scale of the insulating section and external interface section. Also the time from current detection till output of PWM voltage instructions can be reduced by a time for serial communications as well as by a time for an integration operation. This time for current detection can largely be reduced because the time is required only for A/D conversion and proportional operation, which allows response to a current to be speeded up.

With the invention according to another aspect of the present invention, there are steps of separating a plurality of current control sections into the first current control section for executing integration operation in the external interface section and the second current control section for executing proportional operation in the N potential control section, linking the separated sections to each other through serial communications via the insulating section shared therewith, and executing serial communications of the current-control correction value and current instruction value created in the first current control section to the second current control section according to time division by each current control section for each of the motors. Hence a multi-axis motor driving control apparatus can be realized only with slight increase in a circuit scale of the insulating section and external interface section. Also the time from current detection till output of PWM voltage instructions can be reduced by a time for serial communications as well as by a time for an integration operation. This time for current detection can largely be reduced because the time is required only for A/D conversion and proportional operation, which allows response to a current to be speeded up.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A motor driving control apparatus comprising:
    a current detecting section for detecting an output current from an inverter section;
    a current control section for outputting a voltage instruction to a PWM section from a current value detected by said current detecting section, a current instruction inputted from an external device, and a positional signal from a position detector connected to a motor;
    said PWM section for outputting a PWM signal to said inverter section according to the voltage instruction;
    a positional signal input section for receiving a positional signal from said position detector is provided in an external interface section; and
    said current control section and said PWM section is provided in a N potential control section connected to said external interface section so as to be capable of performing serial communications therewith via an insulating section; wherein
    said current detecting section directly inputs a current value detected thereby into said current control section in said N potential control section; and
    said external interface section transmits the current instruction and the positional signal inputted into said positional signal input section to said current control section through serial communications via said insulating section.

2. The motor driving control apparatus according to claim 1 applied to a multi-axis-motor driving control apparatus for controlling a plurality of motors to be driven; wherein
    said N potential control section including said current control section and said PWM section is provided for each of said motors;
    said insulating section is shared with the plurality of said motors; and
    said external interface section has said positional signal input section of each of said motors, said external interface section also has a signal switching section, and said external interface section transmits a current instruction for each of said motors selected by said signal switching section as well as a positional signal inputted into said positional signal input section to said current control section for a corresponding motor through serial communications via said insulating section.

3. A motor driving control apparatus comprising:
    a current detecting section for detecting an output current from an inverter section;
    a current control section for outputting a voltage instruction to a PWM section from a current value detected by said current detecting section, a current instruction inputted from an external device, and a positional signal from a position detector connected to a motor;
    said PWM section for outputting a PWM signal to said inverter section according to the voltage instruction;
    a positional signal input section for receiving a positional signal from said position detector as well as a first current control section are provided in an external interface potential control section; and
    a second current control section and a PWM section are provided in a N potential control section connected to said external interface potential control section so as to be capable of performing serial communications therewith via an insulating section; wherein
    said current detecting section directly inputs a current value detected thereby into said second current control section in said N potential control section;
    said second current control section transmits the received current detected value to the first current control section through serial communications via the insulating section;
    said first current control section creates a current-control correction value and a current instruction value by means of integration operations according to the current instruction received from said external device, the received current detected value, and the positional signal inputted into said positional signal input section; and
    said second current control section receives the current-control correction value and the current instruction value created by said first current control section through serial communications via said insulating section, performs a proportional operation according to the current instruction value inputted from said first current control section as well as the directly inputted current detected value, and creates a voltage instruction to be outputted to said PWM section from the result of the operation, the current-control correction value inputted from said first current control section, and also from the directly inputted current detected value.

4. The motor driving control apparatus according to claim 3; wherein
    a current value detected by said current detecting section is directly inputted into said second current control section in said N potential control section according to a detection cycle of a current value; serial communications of the received current detected value to said first current control section are executed according to a slower cycle than the detection cycle of the current value; the current-control correction value and current instruction value are created in said first current control section according to a serial-communication cycle of the current detected value, and serial communications of the current-control correction value and current instruction value created in said first current control section to said second current control section are executed according to the detection cycle of the current value.

5. The motor driving control apparatus according to claim 3 applied to a multi-axis-motor driving control apparatus for controlling a plurality of motors to be driven; wherein
    said N potential control section including said second current control section and said PWM section is provided for each of said motors;
    said insulating section is shared with the plurality of said motors; and said external interface potential control section has said positional signal input section and said first current control section for each of said motors, said external interface potential control section also has a signal switching section, and said external interface potential control section transmits a current-control correction value and a current instruction value for each of said motors selected by said signal switching section to said second current control section for a corresponding motor through serial communications via said insulating section.

6. The motor driving control apparatus according to claim 3 applied to a multi-axis-motor driving control apparatus for controlling a plurality of motors to be driven; wherein said N potential control section including said second current control section and said PWM section is provided for each of said motors;

said insulating section is shared with the plurality of said motors; and said external interface potential control section has said positional signal input section and said first current control section for each of said motors, said external interface potential control section also has a signal switching section, and said external interface potential control section transmits a current-control correction value and a current instruction value for each of the motors selected by the signal switching section to the second current control section for a corresponding motor through serial communications via said insulating section according to time division by each current control section of each of said motors.

7. A motor driving control method in a motor driving control apparatus, said apparatus having a current detecting section for detecting an output current from an inverter section;

a current control section for outputting a voltage instruction to a PWM section from a current value detected by said current detecting section, a current instruction inputted from an external device, and a positional signal from a position detector connected to a motor;

said PWM section for outputting a PWM signal to said inverter section according to the voltage instruction;

said method comprising the steps of:

directly inputting a current value detected by said current detecting section into said current control section in said N potential control section;

inputting a positional signal from said position detector into a positional signal input section provided in an external interface section; and transmitting, before the current detected value is directly inputted into said current control section, the current instruction from said external interface section as well as the positional signal inputted into said positional signal input section to said current control section provided in said N potential control section through serial communications via said insulating section.

8. The motor driving control method according to claim 7 applied to a multi-axis-motor driving control method for controlling a plurality of motors to be driven; wherein said N potential control section including said current control section and said PWM section is provided for each of said motors;

said insulating section is shared with the plurality of said motors; and said positional signal input section is provided in said external interface section for each of said motors, and a current instruction for each of the motors selected by a signal switching section provided in said external interface section as well as a positional signal inputted into said positional signal input section are transmitted to said current control section for a corresponding motor through serial communications via said insulating section.

9. A motor driving control method in a motor driving control apparatus, said apparatus having a current detecting section for detecting an output current from an inverter section;

a current control section for outputting a voltage instruction to a PWM section from a current value detected by said current detecting section, a current instruction inputted from an external device, and a positional signal from a position detector connected to a motor;

said PWM section for outputting a PWM signal to said inverter section according to the voltage instruction;

said method comprising the steps of:

directly inputting a current detected by said current detecting section into said second current control section provided in said N potential control section;

transmitting the received current detected value to said first current control section provided in an external interface potential control section through serial communications via said insulating section; and said first current control section creates a current-control correction value and a current instruction value by means of integration operations according to the current instruction received from said external device, the received current detected value, and the positional signal inputted into said positional signal input section; and said second current control section receives the current-control correction value and the current instruction value created by said first current control section through serial communications via said insulating section, performs a proportional operation according to the current instruction value inputted from said first current control section as well as the directly inputted current detected value, and creates a voltage instruction to be outputted to said PWM section from the result of the operation, the current-control correction value inputted from said first current control section, and also from the directly inputted current detected value.

10. The motor driving control method according to claim 9 comprising the steps of:

directly inputting a current value detected by said current detecting section into said second current control section in said N potential control section according to a detection cycle of a current value;

performing serial communications of the received current detected value to said first current control section according to a slower cycle than the detection cycle of the current value;

creating the current-control correction value and current instruction value in said first current control section according to a serial-communication cycle of the current detected value; and performing serial communications of the current-control correction value and current instruction value created in said first current control section to said second current control section according to the detection cycle of the current value.

11. The motor driving control method according to claim 9 applied to a multi-axis-motor driving control method for controlling a plurality of motors to be driven; wherein said N potential control section including said second current control section and said PWM section is provided for each of said motors;

said insulating section is shared with the plurality of said motors; and said positional signal input section and said first current control section are provided in said external interface potential control section for each of said motors, and a current-control correction value and a current instruction value for each of said motors selected by a signal switching section provided in said external interface potential control section are transmitted to said second current control section for a corresponding motor through serial communications via said insulating section.

12. The motor driving control method according to claim 9 applied to a multi-axis-motor driving control method for controlling a plurality of motors to be driven; wherein said N potential control section including said second current control section and said PWM section is provided for each of said motors;

said insulating section is shared with the plurality of said motors; and said positional signal input section and said first current control section are provided in said external interface potential control section for each of said motors, and a current-control correction value and a current instruction value for each of said motors selected by a signal switching section provided in said external interface potential control section are transmitted to said second current control section for a corresponding motor through serial communications via said insulating section according to time division by each current control section of each of said motors.

* * * * *